United States Patent [19]
Ando et al.

[11] Patent Number: 5,472,268
[45] Date of Patent: Dec. 5, 1995

[54] BRAKE FLUID PRESSURE CONTROL APPARATUS FOR ANTISKID CONTROL AND TRACTION CONTROL

[75] Inventors: Hiromi Ando; Kunihiro Matsunaga, both of Yamanashi, Japan

[73] Assignee: Tokico Ltd., Kanagawa, Japan

[21] Appl. No.: 133,447

[22] Filed: Oct. 7, 1993

[30] Foreign Application Priority Data

Oct. 14, 1992 [JP] Japan .................. 4-276377

[51] Int. Cl.⁶ .................. B60T 13/18
[52] U.S. Cl. .................. 303/117.1; 303/10; 303/116.2
[58] Field of Search .................. 303/10, 11, 20, 303/113.2, 116.2, 117.1, 900, DIG. 2, 116.1, 116.4

[56] References Cited

U.S. PATENT DOCUMENTS

| | | | |
|---|---|---|---|
| 4,362,339 | 12/1982 | Belart | 303/117.1 |
| 4,729,611 | 3/1988 | Kircher et al. | 303/116.2 |
| 4,750,788 | 6/1988 | Seibert et al. | 303/116.2 X |
| 4,941,712 | 7/1990 | Hirobe | 303/900 X |
| 5,026,123 | 6/1991 | Nokubo et al. | 303/117.1 |
| 5,303,990 | 4/1994 | Ando et al. | 303/117.1 |

FOREIGN PATENT DOCUMENTS

| | | | |
|---|---|---|---|
| 368258 | 5/1990 | European Pat. Off. | 303/117.1 |
| 3200975 | 8/1982 | Germany. | |
| 4016746 | 11/1991 | Germany. | |
| 4134445 | 4/1993 | Germany. | |

*Primary Examiner*—Robert J. Oberleitner
*Assistant Examiner*—Alfred Muratori
*Attorney, Agent, or Firm*—Biebel & French

[57] ABSTRACT

The present invention relates to a brake fluid pressure control apparatus provided with a flow valve which, during the normal operation, when a spool is in the stationary position, a master cylinder communication port is communicated with a wheel cylinder communication port while the pump communication port is closed, and during an antiskid control operation, a pump communication port and a wheel cylinder communication port are communicated, as well as a switching device to switch between the first and the second conditions. In the first condition, a master cylinder communication port is communicated with the output fluid passage of the master cylinder while the communication between the pump communication port and the master cylinder communication port is shut off. In the second condition, the communication between the master cylinder communication port and the output fluid passage of the master cylinder is shut off while the pump communication port and the master cylinder communication port are communicated. Therefore, when two functions, antiskid and traction controls, are to be provided to a brake fluid pressure control apparatus having an antiskid control capability, there is no need to change the flow valve itself, in particular the spool, to provide the two functions.

14 Claims, 6 Drawing Sheets

BRAKE FLUID PRESSURE CONTROL APPARATUS FOR ANTISKID CONTROL AND TRACTION CONTROL

BACKGROUND OF THE INVENTION

1. Field of the Invention

This invention relates to a brake fluid pressure control apparatus for controlling the operation of antiskid control for preventing wheel locking having an added feature of a traction control capability for preventing wheel spin in the acceleration stage.

2. Technical Background

Some brake pressure control apparatuses for antiskid control by preventing wheel locking are provided with flow valves having a casing and a spool. The casing is provided with a plurality of ports. The spool is disposed inside the casing in a biased condition with a spool spring, and switches the communication conditions of each port depending on the pressure difference generated at the end sections of the spool.

However, in systems using such a flow valve, it has been thought conventionally that separate device units are required if an antiskid control capability and a traction control capability are to be provided for one fluid pressure control unit.

SUMMARY OF THE INVENTION

The objective of the present invention is to present a brake fluid pressure control apparatus enabling to provide both antiskid control and traction control functions in one apparatus at low cost.

This objective is provided by a brake fluid pressure control apparatus for controlling the fluid pressure of an antiskid braking system of a vehicle having a master cylinder operatively connected to a pedal, and having wheel cylinders associated with each wheel of the vehicle, wherein the fluid pressure is reduced or increased in accordance with the condition of skidding of the wheels, the apparatus comprising:

(A) a flow valve comprising:
  (a) a casing having a master cylinder communication port communicating with an output passage of the master cylinder; a wheel cylinder communication port communicating with the wheel cylinders for controlling the wheels; a pump communication port communicating with the discharge side of a pumping means for intaking and discharging the brake fluid;
  (b) a spool freely slidably disposed in the casing, the spool being in a stationary position by being pressed by a spool spring during non-skid control state so as to communicate the master cylinder communication port with the wheel cylinder communication port;
  (c) flow control means which closes the pump communication port when the spool is in the stationary position, and at least during the repressurization phase of antiskid control operation communicates the pump communication port with the wheel cylinder communication port when the spool moves against the force of a biasing spool spring to an operating position caused by a pressure differential between the ends of the spool;

(B) switching means disposed between an output fluid passage of the master cylinder and the master cylinder communication port for switching between one state in which the master cylinder communication port is communicated with the output fluid passage of the master cylinder while the communication between the pump communication port and the master cylinder communication port is shut-off, and another state in which the pump communication port is communicated with master cylinder communication port while the communication between the master cylinder communication port and the output fluid passage of the master cylinder is shut-off.

According to the configuration of the apparatus of the present invention, when the antiskid and traction control operations are not being performed, the master cylinder communication port in a flow valve is communicated with the output fluid passage of the master cylinder while the communication between the pump communication port and the master cylinder communication port is shut off by one switching device. Then a spool in the flow valve is in the stationary position, and the master cylinder communication port is communicated with the wheel cylinder communication port. Therefore, the brake fluid pressure in the output fluid passage of the master cylinder is transmitted to the wheel cylinder from the master cylinder communication port.

At this time, if the antiskid control is operated, and even if the brake fluid is discharged from the pumping device during its repressurization phase, the discharge pressure of the pumping device is prevented from returning to the master cylinder, because of the operation of the switching device. Instead, the brake fluid pressure is transmitted to the wheel cylinder from the pump communication port of the flow valve which is opened by the spool moving to the operating position through the wheel cylinder communication port.

During the traction control operation, the switching device shuts off the communication between the master cylinder communication port and the output fluid circuit of the master cylinder while the pump communication port is communicated with the master cylinder communication port. In this case, the spool of the flow valve is in the stationary position, and the flow switching device shuts off the communication between the pump communication port and the wheel cylinder communication port. However, the brake fluid discharged from the pumping device is delivered to master cylinder communication port, without being returned to the master cylinder, through the switching device, and the brake fluid is delivered to the wheel cylinder from the wheel cylinder communication port through the spool in the stationary position.

Therefore, it becomes possible to provide two functions of antiskid control and traction control without adding an extra device to the flow valve itself or changing some aspects of the spool.

PREFERRED EMBODIMENTS OF THE INVENTION

Figure 1:
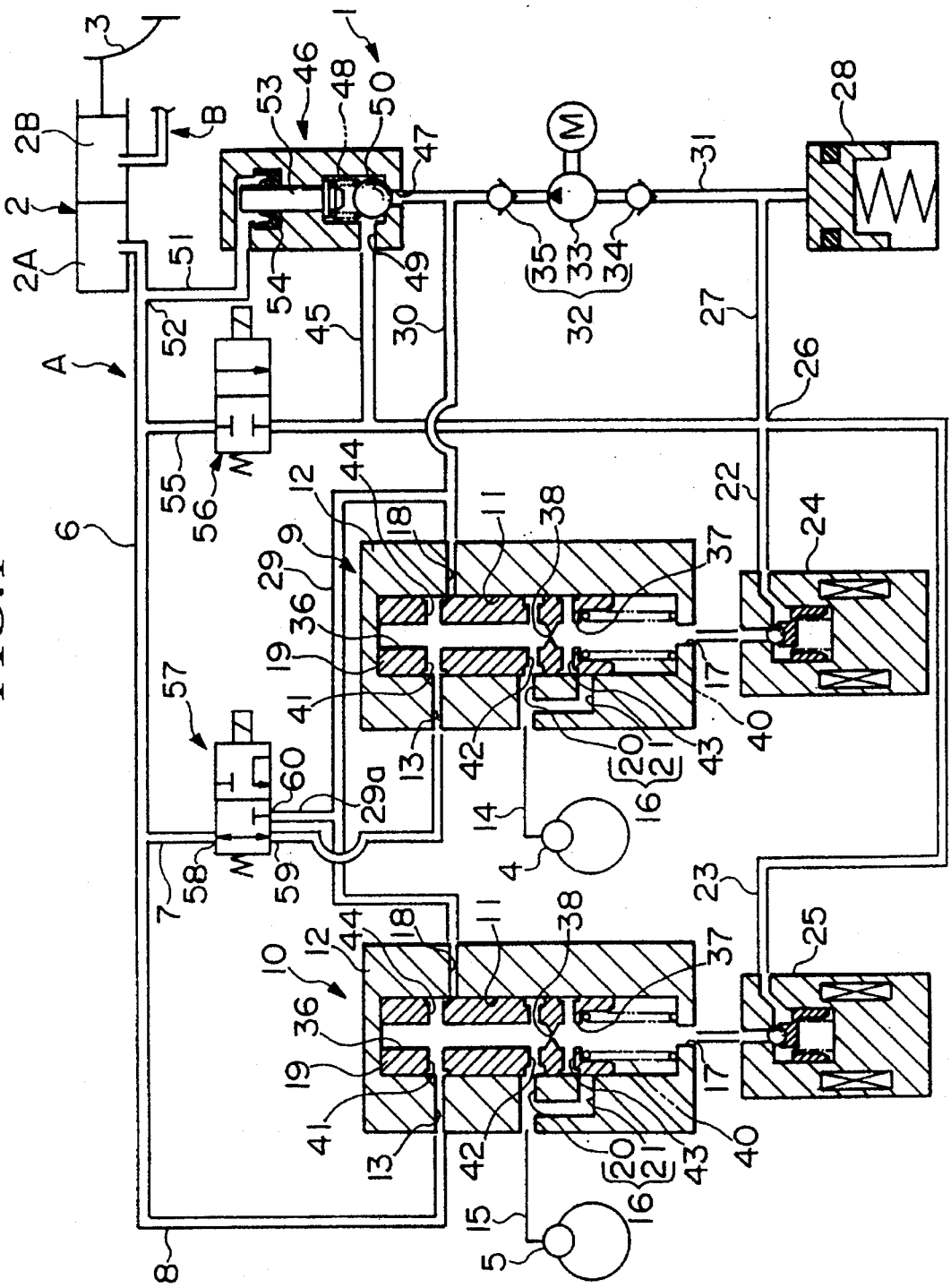
FIG. 1 is a schematic of the overall configuration of a first embodiment of brake pressure control apparatus of the present invention.

The present invention of the brake pressure control apparatus will be explained with reference to FIGS. 1 and 2. In the following descriptions, "up" or "down" are used, for convenience, to refer to the up/down directions in the drawings, and do not necessarily indicate the actual installed orientation of the devices. In the figures, the reference numeral 1 refers to the brake pressure control apparatus. A tandem master cylinder 2 communicates with a brake pedal 3, and is provided with two pressure generation chambers 2A, 2B which generates a pressure in accordance with the degree of pedal pressing. The pressure generated in the pressure generation chambers 2A, 2B is transmitted to each of the two fluid pressure control circuits A, B. The fluid pressure control circuit A, B refer to a control circuit respectively disposed in each brake line of a cross-piped brake line system.

Because the fluid pressure control circuits A, B, are constructed identically, explanation is provided only for one circuit A.

The fluid pressure control circuit A is further divided into two branched lines. One branch line communicates with a wheel cylinder 4 on a driving wheel on one line (for front wheel drive vehicle, a front right wheel for example), and the other branch line communicates with a wheel cylinder 5 on a follower wheel on the other line (back left wheel). The wheel cylinders 4, 5 are fluid pressure devices for operating disk brakes and drum brakes, for example.

The fluid pressure control circuit A comprises: a fluid passage 6 originating from the pressure generation chamber 2A of the master cylinder 2; and fluid passages 7, 8 which branch from the fluid passage 6. A flow valve 9, 10 is provided in each of the fluid passages 7, 8, respectively. Each of the flow valves 9, 10 is provided with a casing 12. The casing 12 is provided with a cylinder section 11 extending up and down, and a plurality of ports.

The plurality of ports refer to master cylinder communication port 13, wheel cylinder communication port 16, reservoir communication port 17 and pump communication port 18.

The master cylinder communication port 13 is disposed at right angle to the cylinder section 11 at a specific location thereof so as to communicate with the pressure generation chamber 2A through fluid passages 7, 8.

The wheel cylinder communication port 16 is disposed a certain distance below the master cylinder communication port 13, and communicates with the wheel cylinders 4, 5 through the fluid passages 14, 15.

The reservoir communication port 17 is disposed below the cylinder section 11 following the axis of the cylinder section 11.

The pump communication port 18 is disposed opposite to the master cylinder communication port 13. The axis of the pump communication port 18 is offset a certain distance below the axis of the master cylinder communication port 13.

The wheel cylinder communication port 16 comprises an upper port 20 and a lower port 21. The upper port 20 is disposed a certain distance below and parallel with the master cylinder communication port 13. The lower port 21 is disposed a certain distance below and parallel with the upper port 20, and communicates with the upper port 20 externally.

The reservoir communication port 17 of the flow valves 9, 10 communicates with each of the fluid passages 22, 23. The fluid passages 22, 23 are, respectively, provided with a normally closed (n/c) magnetic valve, 24, 25. The fluid passages 22, 23 are merged at a merging point 26. The merging point 26 is connected with a fluid passage 27. The fluid passage 27 is provided with one variable volume reservoir 28. The pump communication ports 18 of each of the flow valves 9, 10 communicate with each other in the fluid passage 29. The fluid passage 29 is connected to a fluid passage 30. The fluid passage 30 and the fluid passage 27 are connected by way of a fluid passage 31. In the fluid passage 31, a pump 32 is provided. The pump 32 comprises: a pump body 33, an intake valve 34 and a discharge valve 35. The pump body 33 is operated by a motor, and withdraws or discharges the brake fluid. The intake valve 34 is disposed between the pump body 33 and the reservoir 28. The discharge valve 35 is disposed between the pump body 33 and the fluid passage 30. The pump 32 draws the brake fluid from the reservoir 28, and discharges it in the fluid passage 30.

Inside the cylinder section 11 of the flow valves 9, 10, there is engagingly inserted a cylinder shaped spool 19 which can freely slide up/down. The spool 19 is provided with an upper hole 36 of a specific diameter; a lower hole 37 of a specific diameter; and a small diameter hole 38 of a smaller diameter than either the upper hole 36 or the lower hole 37. The upper hole 36 starts from the top end of the spool 19, and extends along the axis of the spool 19 to a specific location thereof. The lower hole 37 starts from the bottom end of the spool 19, and extend along the axis of the spool 19 to the same specific location coaxially with the upper hole 36 and at the same diameter. The lower hole 37 is always in communication with the reservoir communication port 17. The upper hole 36 and the lower hole 37 are communicated with each other at the small diameter hole 38. The opening section of the bottom end of the lower hole 37 is made so that its diameter is larger by a specific amount than other parts. In the opening section, the upper end of a spool spring 40 is inserted therein so as to force the spool 19 upward with some force.

The spool 19 includes: the upper hole 36; the lower hole 37; and a plurality of holes which intersect the holes 36, 37 at right angles. These holes are a first hole 41, a second hole 42; a third hole 43 and a fourth hole 44.

The first hole 41 is disposed a specific distance below the top end of the spool 19. When the spool 19 is in the stationary position (shown in FIG. 1) by being forced by the spring 40 and being in contact with the top surface of the cylinder section 11, the first hole 41 communicates the upper hole 36 with the master cylinder communication port 13. During an antiskid control operation when the spool 19 is in the operating position caused by a pressure differential exiting at the top and bottom end sections of the spool 19, the first hole 41 shuts off the communication of the master cylinder communication port 13 with the upper hole 36.

The second hole 42 is disposed a certain distance below the first hole 41. When the spool 19 is in the stationary position, the second hole 42 communicates the upper hole 36 with the upper port 20 of the wheel cylinder communication port 16. When the spool 19 is in the operating position, the second hole 42 shuts off the communication between the upper hole 36 and the upper port 20.

The third hole 43 is disposed a specific distance below the second hole 42. When the spool 19 is in the stationary position, the third hole 43 shuts off the communication between the lower hole 37 and the lower port 21 of the wheel cylinder communication port 16. When the spool 19 is in the operating position, the third hole 43 communicates the lower hole 37 with the lower port 21.

The fourth hole 44 is disposed coplanarly with and opposite to the first hole 41 with both axes lying on one plane. When the spool 19 is in the stationary position, the fourth hole 44 shuts off the communication between the upper hole 36 and the pump communication port 18. When the spool 19 is in the operating position, the fourth hole 44 communicates the upper hole 36 and the pump communication port 18.

For convenience, the first hole 41 and the fourth hole 44 were presented as separate holes, there is in fact no difference between the two holes, because there is a groove of the same width provided on the outer periphery of the spool 19. It is permissible to provide the groove only on one of the two holes. The second hole 42 and the third hole 43 are similar, because there is a groove on the outer periphery of the spool 19.

The pump communication port 18 is offset below with respect to the master cylinder communication port 13. For this reason, when the spool 19 is in the stationary position, the master cylinder communication port 13 is in the open state, and the pump communication port 18 is in the closed state. When the spool 19 is in the operating position, the master cylinder communication port 13 is closed, and the pump communication port 18 is open, thus communicating the pump communication port 18 with the wheel cylinder communication port 16. Here, the pump communication port 18 which is offset to the master cylinder communication port 13 and the spool 19 constitute the fluid flow control device of the fluid pressure control apparatus of the present invention.

Also, the fluid flow control device can also be made in the following configuration. The master cylinder communication port 13 and the pump communication port 18 are disposed so that their axes are disposed coplanarly; the pump communication port 18 is made larger diameter than the master cylinder communication port 13; and, provide a valve biased with a spring on the pump communication port 18 so that a part of the valve member will project into the groove on the spool 19, and thereby closing the pump communication port 18. When the spool 19 is moved, the valve member moves from the groove to the outer periphery of the spool 19, thereby opening the pump communication port 18 against the biasing force of the spring.

The discharge sections of the merging point 26 and the pump 32 are connected to each other by a fluid passage 45, and the fluid passage 45 is provided with a relief valve 46. The relief valve 46 comprises: a port 47, a spring 48, a port 49, a valve body 50, a piston 53 and a cup seal 54.

The port 47 is connected to the discharge side of the pump 32.

The port 49 is connected to the in-take side of the pump 32.

The valve body 50 is biased with the spring 48 in the direction to close the port 47. Also, the valve body 50 relieves the excess discharge pressure from the port 49 when it is being moved.

The piston 53 contacts the valve body 50 when the brake fluid pressure transmitted from the fluid passage 51 which connects with the fluid passage 6 at the merging point 52 exceeds a specific valve determined by the biasing force of the spring 48. By so doing, the fluid pressure from the master cylinder 2 acts to close the valve body 50.

The cup packing 54 drains the brake fluid to the master cylinder 2 side, when the brake fluid pressure generated by the master cylinder 2 becomes lower than that in the reservoir 28 side.

During the traction control operation in which the master cylinder 2 does not generate a brake pressure, the relief valve 46 sets the discharge pressure at a relatively high specific value; and during the antiskid control operation and, when the fluid pressure in the master cylinder 2 side exceeds the above specific value, the relief valve 46 makes the discharge pressure of the pump 32 to nearly equal the brake pressure on the master cylinder 2 side.

Between the portion downstream of the merging point 52 in the fluid passage 6 and the fluid passage 45 which connects to the port 49, is connected a fluid passage 55. The fluid passage 55 is provided with a n/c magnetic valve 56 which acts as the shut-off device. The n/c magnetic valve 55 shuts off the fluid passage 55 in the deactivated state and communicates the fluid passage 55 in the magnetized state.

A dual-position three-port magnetic switching valve 57 is provided on the fluid passage 7 which communicates between the flow valve 9 on the driving wheel side and the master cylinder 2. The port 58 of the magnetic switching valve 57 communicates with the master cylinder 2 through the fluid passages 6, 7. The port 59 communicates with the master cylinder communication port 13 of the flow valve 9 through the fluid passage 7. The port 60 communicates with the pump communication port 18 of each flow valves 9, 10 through the fluid passage 29a connecting with the fluid passage 29.

In the deactivated state, the magnetic switching valve 57 communicates the port 58 with the port 59, and at the same time closes the port 60. By so doing, the master cylinder communication port 13 of the flow valve 9 communicates with the master cylinder 2, and shuts off the communication between the pump communication port 18 and the master cylinder communication port 13. In the magnetized state, the magnetic switching valve 57 communicates port 59 with the port 60, and at the same time closes the port 58. By so doing, the communication between the master cylinder communication port 13 and the master cylinder 2 is shut off, and the pump communication port 18 and the master cylinder communication port 13 are communicated.

Figure 2:
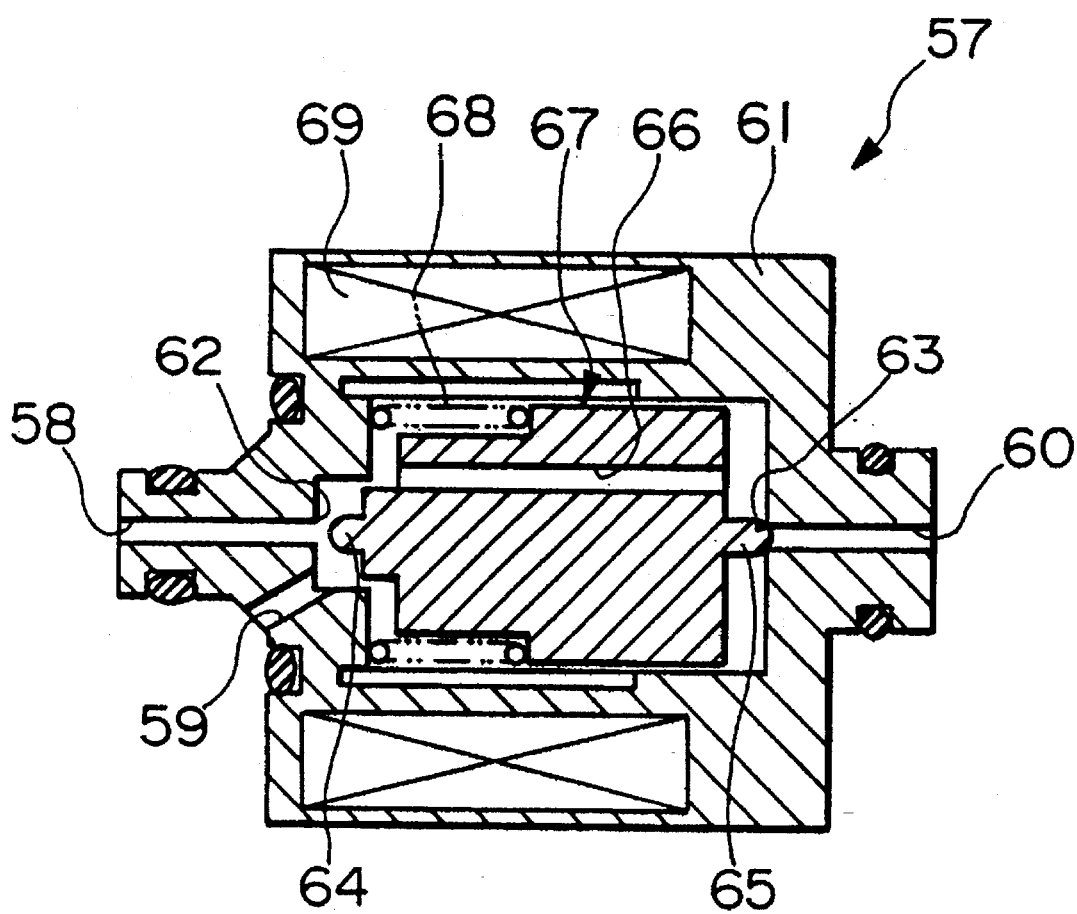
FIG. 2 is a cross sectional view of the switching device of the brake pressure control apparatus of the first embodiment.

The magnetic switching valve 57 is provided with a housing 61, valve body 67 and a spring 68, as shown in FIG. 2. The housing 61 is cylinder-shaped with closed ends which are provided with ports 58, 60, respectively, which extend in the axial direction of the housing 61. The valve body 67 is slidably disposed inside the housing 61, and is provided with valve sections 64, 65 at the ends as well as a through hole 66 extending along the axial direction of the housing 61. The valve sections 64, 65 are made so that they can respectively opens or closes the opening section 62 of the port 58 and opening section 63 of the port 60. The spring 68 biases the valve body 67 in the direction of the port 60.

Also, at a specific location of the casing 61 on the side of the port 58, there is formed a port 59. When the solenoid 69 provided on the housing 61 is deactivated, the valve body 67 closes the opening section 63 of the port 60 by the biased force of the spring 68. This makes the port 58 to communicate with the port 59. When the solenoid 69 is magnetized, the valve body 67 is attracted by the solenoid 69, and moves against the biasing force of the spring 68. By so doing, the valve body 67 closes the opening section 62 of the port 58 and opens the port 60, thereby communicating the port 60 with the port 59 through the through hole 66.

Here, a part of the fluid passage 6 which connects the magnetic switching valve 57 with the master cylinder 2 and a part of the fluid passage 7 constitute the output fluid passage.

Next, the operation of the brake fluid pressure control apparatus 1 of the first embodiment, as constructed above, will be explained in the following. In this case, the antiskid control operation is for the purpose of preventing locking of the wheels when the brakes are operated, and the traction control operation is for the purpose of preventing spinning the wheels when accelerating. Therefore, these two operations will never take place at the same time. Therefore the explanations are provided separately.

When the traction control section (not shown) detects that accelerating driving wheels are tending to spin, based on information from wheel speed sensors (not shown), the traction control section activates the n/c magnetic valve 56 and the magnetic switching valve 57, and also turns on the pump 32. Then, the pump 32 withdraws the brake fluid from the fluid passage 6, through the fluid passage 55 having the n/c magnetic valve 56 open, and discharges the brake fluid. The discharge pressure of the pump 32 is transmitted to the port 60 of the magnetic switching valve 57 while being regulated at a constant pressure by the relief valve 46. At this time, the magnetic switching valve 57 closes the port 58, and the port 60 is communicated with the port 59. Accordingly, the discharge pressure of the pump 32 is transmitted to the master cylinder communication port 13 of the flow valve 9 on the driving wheel side, without being transmitted to the master cylinder 2. At this time, the pump communication port 18 of each of the flow valves 9, 10 is closed because the spool 19 is in the stationary position. Because the spool 19 is in the stationary position, the brake fluid admitted from the master cylinder communication port 13 flows into the wheel cylinder 4, on the driving wheel side, at a relatively large flow rate through the first hole 41, upper hole 36, the second hole 42 and the upper port 20 so as to perform a traction control operation.

If, during the traction control operation, it becomes necessary to reduce the fluid pressure in accordance with instruction from the traction control section, the magnetic switching valve 24 is activated to open. By so doing, the brake fluid pressure in the wheel cylinder 4 is lowered by releasing the brake fluid to the intake side of the pump 32 through the lower port 21, reservoir communication port 17 and others. If a command to increase the pressure is again issued by the traction control section, the n/c magnetic valve 24 is closed. By so doing, the brake fluid flows into the wheel cylinder 4 as before, and the fluid pressure in the wheel cylinder 4 is increased.

To cancel the traction control operation, the traction section stops the pump 32, deactivates the magnetic switching valve 57, and activates the n/c magnetic valve 24 to open. Accordingly, the brake fluid flows out of the flow valve 9 to the fluid passage 22 through the lower port 21, the third hole 43, the lower hole 37 and the reservoir communication port 17. This brake fluid is returned to the master cylinder 2 through the fluid passage 55 which is in the communication state, through the activated n/c magnetic valve 56. The traction control section deactivates the n/c magnetic valve 56 as the brake fluid is returned to the master cylinder 2.

If, during the operation of the traction control, the sensor (not shown) detects that the brake pedal 3 has been pressed, the traction control section deactivates the n/c magnetic valve 56 and the magnetic switching valve 57 immediately.

During the normal braking operation, the n/c magnetic valve 56 and the magnetic switching valve 57 are in the deactivated state. Therefore, the brake fluid pressure generated in the master cylinder 2, in accordance with the braking operation, is transmitted to each of the wheel cylinders 4, 5 through the master cylinder communication port 13, the first hole 41, upper hole 36, the second hole 42 and the upper port 20 of the spools 19 which are in the stationary state in the two flow valves 9, 10.

If, during the course of such braking operation, the antiskid control section (not shown) detects, on the basis of the output information from wheel speed sensors (not shown), that the wheels are tending to lock, then, in accordance with the signals from the antiskid control section, the n/c magnetic valves 24, 25 are opened (if only one side is to be skid-controlled, only the n/c magnetic valves in the corresponding side will be opened). Then, the brake fluid on the lower hole 37 side of the flow valves 9, 10 flows into the reservoir 28, and as a result, a pressure differential is generated between the top and bottom sides of the spool 19. This pressure difference causes the spool 19 to move down. Then, the spool 19 shuts off the communication between the master cylinder communication port 13 and the first hole 41, and communicates the wheel cylinders 4, 5 with the reservoir 29 through the lower port 21, the third hole 43, the lower hole 37 and the reservoir communication port 17 and others. By so doing, the brake fluid in the wheel cylinders 4, 5 flows into the reservoir 28, leading to a decrease in the fluid pressure in the wheel cylinders 4, 5. Further, the movement of the spool 19 causes the pump communication port 18 to be in the open state.

During the antiskid control operation, the pump 32 is always in operation as a result of the signal from the antiskid control section. Therefore, during the above pressure decrease phase, the brake fluid from the reservoir 28 discharged by the pump 32 is made to follow the fluid pressure level generated in the master cylinder 2 by the operation of the relief valve 46, and then it is admitted into the pump communication port 18, which is open, of the flow valves 9, 10. The brake fluid is made to circulate to the reservoir 28, by means of the spool 19 which is in the operating position through the pump communication port 18, the fourth hole 44, the upper hole 36, the small diameter hole 38, the lower hole 37 and the reservoir communication port 17 and others. The spool 19 moves up and down as a result of the top/bottom pressure differential of the spool 19, determined by the small diameter hole 38, and the brake fluid enters through the small diameter hole 38 into the reservoir 28, at about a constant volume flow rate.

When the antiskid control operation is to be changed from the above-described pressure decrease phase to the repressurization phase of the antiskid control operation, the n/c magnetic valves 24, 25 are closed by the signal from the antiskid control section. Then, the brake fluid, on the side of the reservoir 28, discharge by the pump 32 flows into the wheel cylinders 4, 5 through the pump communication port 18, the fourth hole 44, the upper hole 36, the small diameter hole 37, the third hole 43 and the lower port 21 of the flow valves 9, 10, thereby repressurizing the wheel cylinders 4, 5. In this case, the spool 19 moves up/down as a result of the top/bottom pressure differential determined by the small diameter hole 38, and the brake fluid flows into the wheel cylinders 4, 5 through the small diameter hole 38 at about a constant value flow rate, thereby repressurizing the wheel cylinders 4, 5.

In the above-described cases of pressure increase or pressure decrease phase of the antiskid control operation, the magnetic switching valve 57 is always in the deactivated state. For this reason, there is no chance that the discharge pressure from the pump 32 is returned to the master cylinder 2 by way of the magnetic switching valve 57.

As explained above, the brake pressure control apparatus 1 of the first embodiment utilizes a magnetic switching valve 57, provided separately to the flow valves 9, 10, performs the two functions of antiskid control as well as traction control operations, thus it becomes not necessary to provide separate devices in conjunction with the spool 19 of the flow valves 9, 10.

During the traction control operation, the spools 19 in both flow valves 9, 10 close the pump communication port 18, and the magnetic switching valve 57 of the flow valve 9 on the driving wheel side, and shuts off the communication between the pump communication port 18 and the master cylinder 2. Therefore, in the brake fluid pressure control apparatus 1 of the first embodiment, even if one pump 32 for one line is used, there is no loss of discharge pressure of the pump 32, and the wheel cylinder 4 on the driving wheel side is able to provide good traction control.

During the antiskid control operation, the master cylinder communication port 13 is closed by the spool 19 of the flow valves 9, 10 in the operating position, and when the antiskid control is not operating, the pump communication port 18 is closed by the spool 19. Therefore, when both flow valves 9, 10 are in the antiskid control operation, the master cylinder communication ports 13 become closed in both flow valves 9, 10 by the spools 19 in the operating position. Therefore, the brake pressure control apparatus 1 of the first embodiment is able to perform antiskid control operation without any loss of discharge pressure from the pump 32. Furthermore, even if only one side of the flow valves 9, 10 is in the antiskid control operation, the pump communication port 18 in the other flow valve is closed by the spool 19, the discharge pressure of the pump 32 is not permitted to escape through the other flow valve, and also it is possible to prevent the effects of the discharge pressure of one flow valve from affecting the master cylinder 2 through the other valve.

Because the brake pressure control apparatus 1 of the first embodiment is provided with a n/c magnetic valve 56, it is able to withdraw and discharge the brake fluid from the master cylinder 2 by the pump 32 during the traction control operation, and at other times, it prevents the escape of the brake fluid to the intake side of the pump 32 from the fluid passage 6 of the master cylinder 2.

Figure 3:
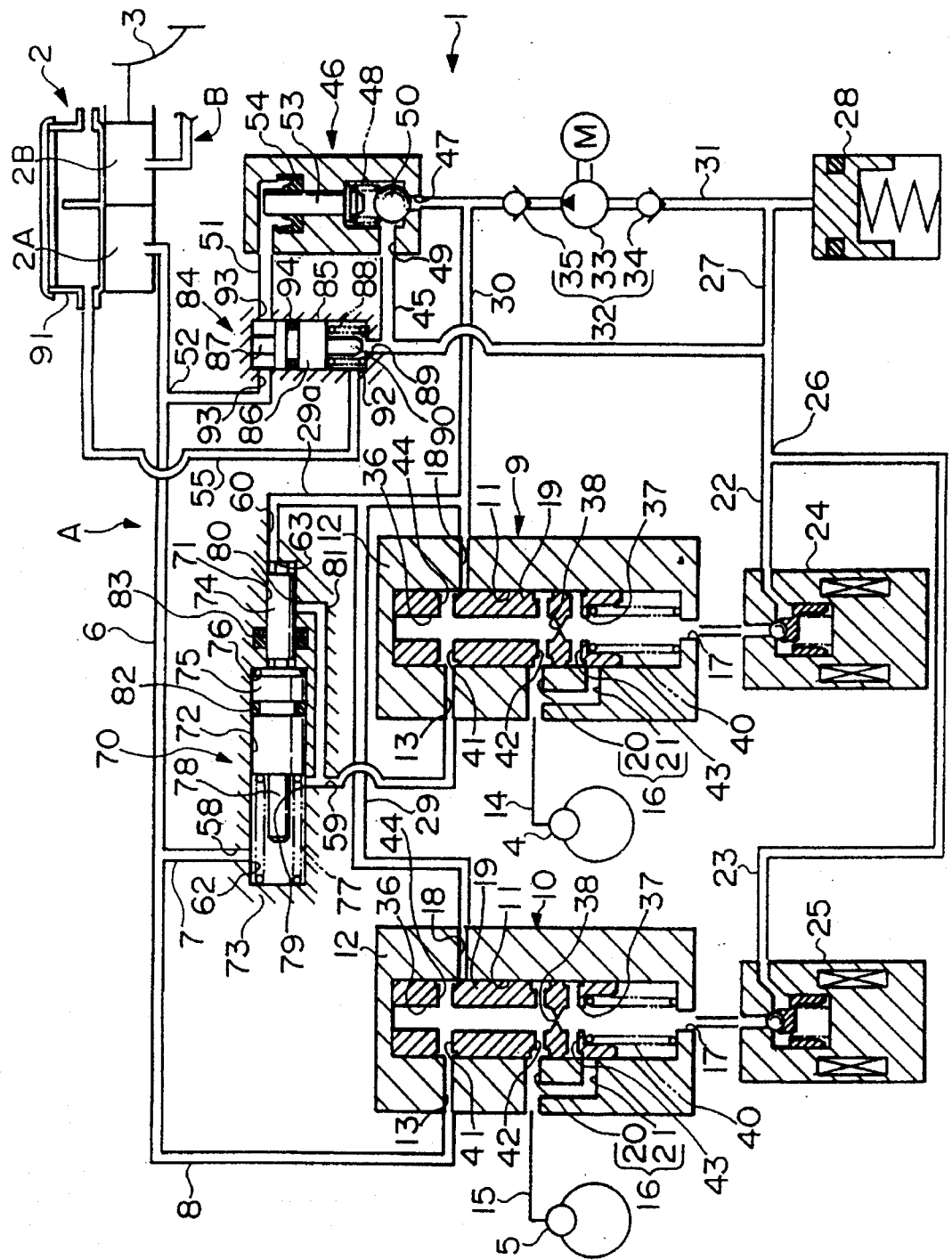
FIG. 3 is a schematic of the overall configuration of a second embodiment of brake pressure control apparatus of the present invention.
Figure 4:
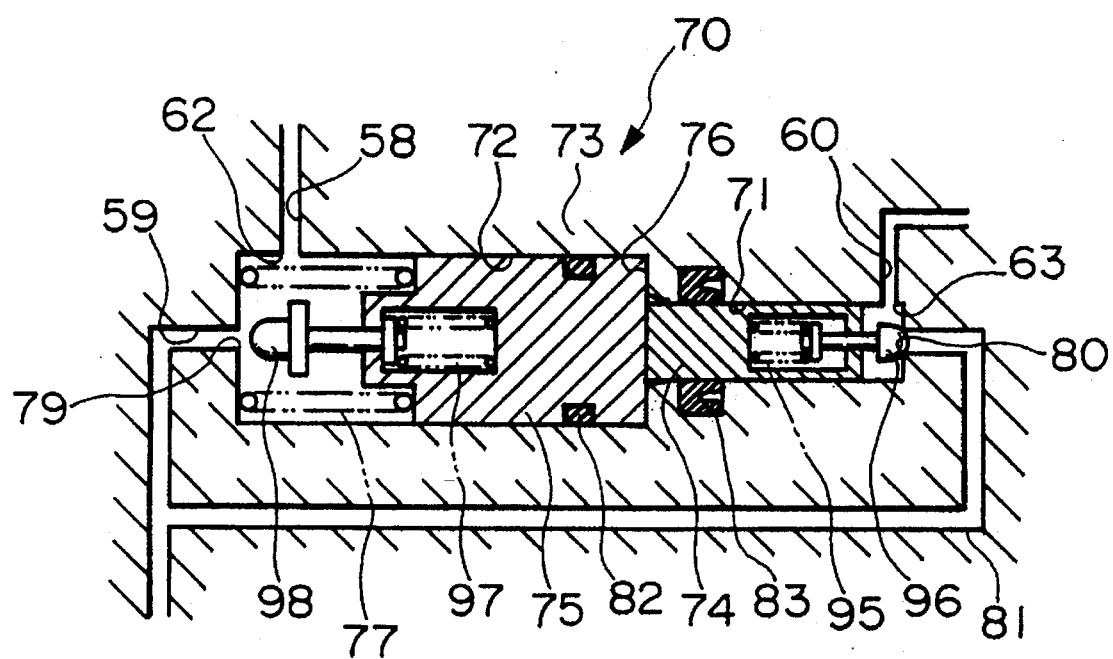
FIG. 4 is a cross sectional view of the switching device of the brake pressure control apparatus of the second embodiment.

Next, a second embodiment of the brake fluid pressure control apparatus of the present invention will be explained with reference to FIG. 3. Here, the construction of the switching device and shut-off devices of the second embodiment is different from those of the first embodiment, so the differences will be explained mainly; the same parts are referenced by the same reference numerals, and their explanations will be omitted.

The switching device in the second embodiment is a switching valve 70 which comprises: a housing 73, a small diameter piston 74, a large diameter piston 75 and a piston spring 77.

The housing 73 is provided with a small diameter hole section 71 and a larger diameter hole section 72 of a slightly larger diameter in a series arrangement.

The smaller diameter piston 74 has about the same diameter as that of the small diameter hole section 71 of the housing 73, and is slidably inserted in the small diameter hole section 71.

The large diameter piston 75 is provided separately from the small diameter piston 74, and has about the same diameter as that of the large diameter hole section 72, and is slidably inserted in the larger diameter hole section 72.

The piston spring 77 is insertably disposed in the axial section 78 formed in the large diameter piston 75, opposite to the small diameter piston 74 of the large diameter piston 75. The piston spring 77 provides a biasing force to push the large diameter piston 75 towards the small diameter piston 74, and forces the large diameter piston 75 to butt up against a step section 76 which forms a boundary between the small diameter hole section 71 and the large diameter hole section 72.

The axial length of the large diameter piston 75 is made slightly shorter than that of the large diameter hole section 72, and the axial length of the small diameter piston 74 is made about the same as that of the small diameter hole section 71. One end surface of the small diameter piston 74 receives the discharge pressure of the pump 32, and the end surface of large diameter piston 75 receives the brake fluid pressure from the master cylinder 2. The large diameter piston 75 and the small diameter piston 74 can be made in a unit construction.

The opening section 62 of the port 58 connected to the master cylinder 2 is disposed in a specific location of the larger diameter hole section 72 so that, even if the large diameter piston 75 moves to a position where the axial section 78 touches the housing 73, the opening section 62 will not be closed by the large diameter piston 75. The opening section 79 of the port 59 connected to the master cylinder communication port 13 is disposed in a specific location of the larger diameter hole section 72 so that it is opened when the larger diameter piston 75 is in contact with the step section 76, and is closed immediately upon moving of the large diameter piston 75. The opening section 63 of the port 60 communicating with the pump communication port 18 through the fluid passage 29a is disposed on the end surface of the small diameter hole section 71 opposite to the large diameter hole section 72. The housing 73 is provided with a fluid passage 81. The fluid passage 81 communicates with the port 59 on the outside, and has an opening section 80 in a specific location of the midpoint of the small diameter hole section 71.

Therefore, under the condition that the fluid pressure is not acting on the large diameter piston 75, when the small diameter piston 74, under the influence of the discharge fluid pressure of the pump 32, pushes the large diameter piston 75, and moves together with the large diameter piston 75, the opening section 79 of the port 59 is closed, followed by opening of the opening section 80 of the fluid passage 81. Here, the difference between the larger diameter piston 75 and the small diameter piston 74 is chosen such that even when the discharge pressure of the pump 32 is introduced at the port 60, if a brake fluid pressure exceeding a specific value of the master cylinder 2 is generated at the port 58, the large diameter piston 75 returns to a location to be in contact with the step section 76.

Here, there is a seal member 82 disposed on the outer periphery of the large diameter piston 75. The seal member 82 prevents fluid leaks between the small diameter hole section 71 and the ports 58, 59 regardless of the position of the large diameter piston 75. The small diameter hole section 71 is provided with a seal member 83 between the larger diameter piston 75 and the opening section 80. The seal member 83 prevents fluid leaks between the port 60 and the larger diameter hole section 72 side.

The shut-off valve 84 which is the opening or closing device of the second embodiment is provided with a housing 85, a piston 86 and piston spring 88. The housing 85 is cylinder shaped. The piston 86 is slidably inserted in the housing 85. The piston spring 88 is disposed at one end of the piston 86 and presses the piston 86, and forces an axial section 87 formed on the other end of the piston 86 to the housing 85.

A port 89 is disposed on one end side of the housing 85. The port 89 communicates with the intake side of the pump 32 through the fluid passage 45. A valve section 90 is disposed on one end side of the piston 86. The valve section 90 closes the port 89 when it moves against the biasing force of the piston spring 88. A port 92 is disposed at a location on the port 89 side, which will not be closed by the piston 86. The port 92 communicates with the reservoir section 91 which stores the brake fluid of the master cylinder 2 through the fluid passage 55. Near the end surface opposite to the port 89 of the housing 85, there is a port 93 disposed at a location which will not be closed by the piston 86. The port 93 communicates with the fluid passage 51.

In the condition that the brake pedal 3 is operated, including the case of antiskid control operation, that is the condition corresponding to the generation of fluid pressure in the master cylinder 2, and the fluid pressure acts on the piston 86 of the shut-off valve 84 through the port 93, and closes the port 89 by moving against the bias force of the piston spring 88. The shut-off valve 84, in the condition of master cylinder 2 not generating any pressure, makes the piston 86 to communicate the port 89 and port 92 by the biasing force of the piston spring 88, that is, communicates the reservoir section 91 and the intake side of the pump 32. Here, the outer periphery of the piston 86 is provided with a seal member 94. This seal member 94 prevents fluid leaks between the ports 89, 92 and the port 93.

The operation of the second embodiment of the brake fluid control apparatus is similar to that of the first embodiment presented earlier, therefore, the explanation will center mainly around the different construction of the switching valve 70 and the shut-off valve 84.

When the traction and the antiskid controls are not in operation, the switching valve 70 is in a condition of having the large diameter piston 75 in contact with the step section 76 by the biasing force of the piston spring 77. In this condition, the port 58 and port 59 are communicated, and the communication of the port 60 with the fluid passage 81 is shut off. In this condition, even if the brake pedal 3 is operated, and the brake fluid pressure from the master cylinder 2 is transmitted and the fluid pressure is applied to the large diameter piston 75, the above condition is maintained. At the same time, the brake fluid pressure is transmitted from the master cylinder communication port 13 of the flow valves 9, 10, in which the spools 19 are in the stationary position, through the upper port 20 to the wheel cylinders 4, 5.

Here, even if the antiskid control operation is activated, and the brake fluid is discharged from the pump 32, the switching valve 70, because of the fluid pressure acting on the large diameter piston 75 shutting off the communication between the port 60 and the fluid passage 81, the discharge pressure of the pump 32 is transmitted from the pump communication port 18 of the flow valves 9, 10, which is opened by the spool 19 in the operating position, to the wheel cylinder 4, 5, or to the reservoir 28 through the reservoir communication port 17.

In this case, as explained above, in the condition of the master cylinder 2 generating brake fluid pressure, the shut-off valve 84 is closed, and there is no chance of the brake fluid withdrawn into the intake side of the pump 32 through the shut-off valve 84.

On the other hand, during the operation of the traction control, because the apparatus is in a condition that the fluid pressure is not transmitted from the fluid passage 6, the piston 86 of the shut-off valve 84 is not subjected to the fluid pressure. Therefore, the port 89 and port 92 are communicated. If the pump 32 is operated in this condition, the pump 32 withdraws brake fluid from the reservoir section 91 and discharges it. The discharge pressure of the pump 32 acts on the switching valve 70 of the small diameter piston 74, and moves the small diameter piston 74 and the large diameter piston 75 against the biasing force of the piston spring 77. The move of the small diameter piston 74 and the large diameter piston 75 causes the communication between the port 58 and port 59 to be shut off, followed by the communication of the port 60 with the fluid passage 81. At this time, the spool 19 of the flow valve 9 is in the stationary position, and the communication between the pump communication port 18 and the wheel cylinder communication port 16 is shut off. The brake fluid discharged from the pump 32 is transmitted to the master cylinder communication port 13 through the switching valve 70, without being returned to the master cylinder 2. The brake fluid discharged from the pump 32 is introduced to the wheel cylinder 4 from the port 20 through the spool 19 in the stationary position, thereby pressurizing the wheel cylinder 4.

Further, if the pedal 3 is operated when the traction control is in operation, the shut-off valve 84 becomes closed due to the pressure generated, thus stopping the pump discharge. At the same time, the fluid pressure also acts on the large diameter piston 75 of the switching valve 70 and returns the large diameter piston 75 to the position to butt up against the step section 76.

Therefore, in addition to the effects described in the first embodiment, the switching valve 70 and the shut-off valve 84 are also operated in response to the fluid pressure, there is no need to employ expensive magnetic valves, and the cost can be reduced.

In the above, various other types of devices can be used as the switching valve 70. An opening section 63 of the port 60 is disposed on the small diameter hole section 71, and opposite to the large diameter section 72. The opening section 80 of the fluid passage 81 is disposed on the axial extension of the small diameter hole section 71. The small diameter piston 74 is provided with a poppet valve 96. The poppet valve 96 is biased with the spring 95 so as to enable closing the opening section 80. The opening section 79 of the port 59 which communicates with the master cylinder communication port 13 is disposed on the axial extension of the large diameter hole section 72. The large diameter piston 75 is provided with a poppet valve 98. The popper valve 98 is biased with the spring 97 so as to enable closing the opening section 79.

In the switching valve 70, under the condition of being biased with the piston spring 77 or under the condition of application of the fluid pressure from the master cylinder 2, the popper valve 96 is closing the fluid passage 81 and the popper valve 98 is opening the port 59. Under the condition of the brake fluid pressure of the master cylinder 2 not operating, if the discharge pressure of the pump 32 operates on the small diameter piston 74, the small diameter piston 74 and the large diameter piston 75 move together as a unit. In this condition, while maintaining the condition of the poppet valve 96 closing the fluid passage 81 by the biasing force of the spring 95, the poppet valve 98 closes the port 59. Upon further moving, the poppet valve 96 reaches the limit of movement in the small diameter 74, and moves with the small diameter piston 74, and thereby closing the fluid passage 81.

Figure 5:
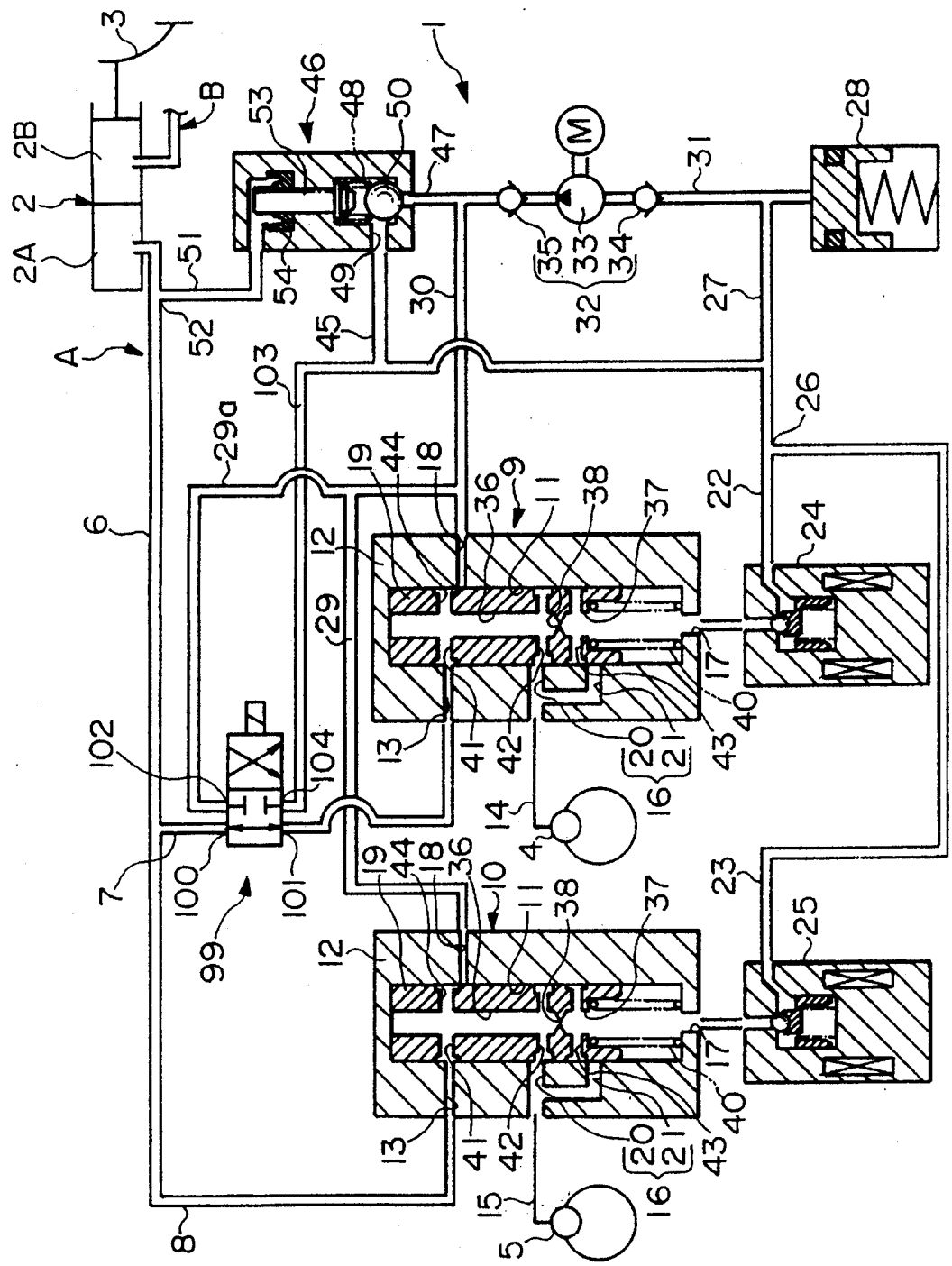
FIG. 5 is a schematic of the overall configuration of a third embodiment of brake pressure control apparatus of the present invention.
Figure 6:
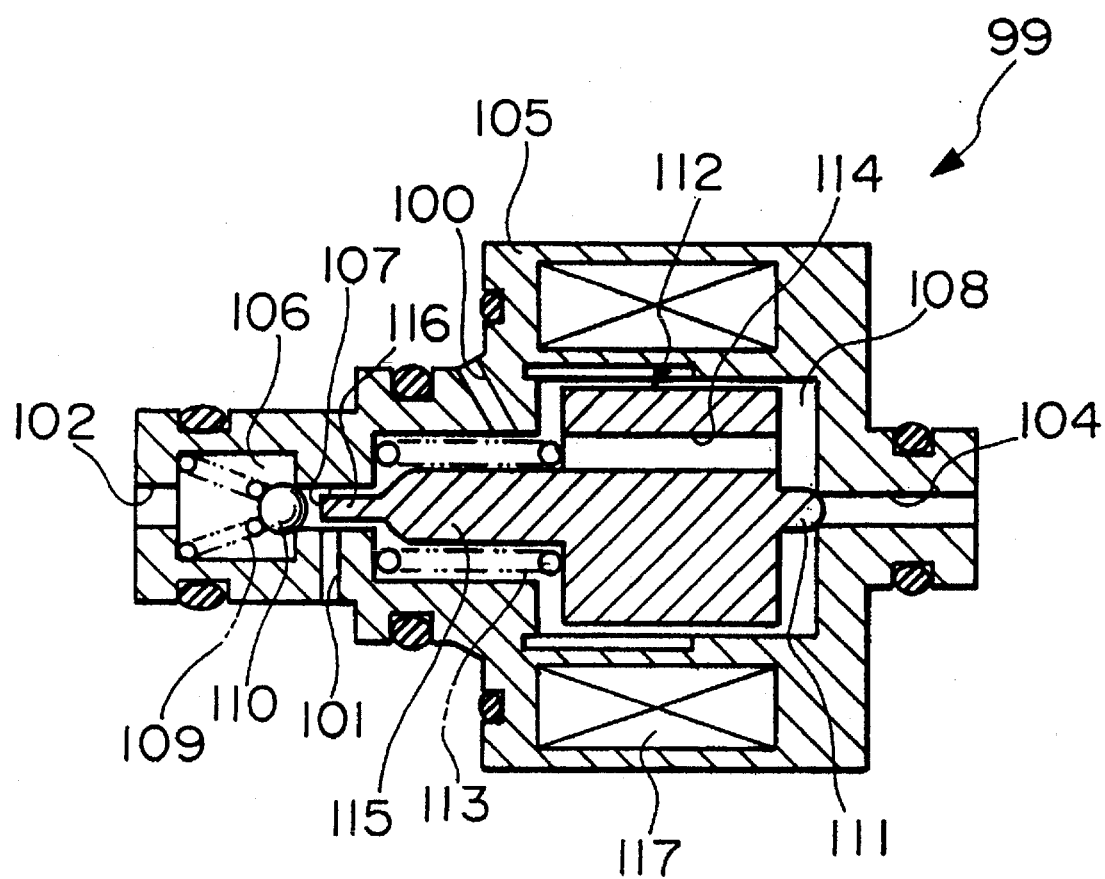
FIG. 6 is a cross sectional view of a magnetic switching unit which integrates the switching device and the shut-off device of the third embodiment of the brake pressure control apparatus in a unitized device.

Next, a third embodiment of the brake fluid pressure control apparatus of the present invention will be explained with reference to FIGS. 5 and 6. Here, the integral construction of the switching device and shutoff devices of the third embodiment is different from the construction of the first embodiment, the differences will be mainly explained; the same parts are referenced by the same reference numerals, and their explanations will be omitted.

The magnetic switching valve 99 of the third embodiment is a dual-position, four-port construction, and is provided with a port 100, port 101, port 102, and port 104. The port 100 communicates with the master cylinder 2 through the fluid passage 7. The port 101 communicates with the master cylinder communication port 13 of the flow valve 9 through the fluid passage 7. The port 102 communicates with the pump communication port 18 of the flow valves 9, 10 through the fluid passage 29a. The port 104 communicates with the intake side of the pump 32 through the fluid passage 103 which connects with the fluid passage 45.

In the deactivated state, the magnetic switching valve 99 communicates the port 100 with the port 101, and closes the port 102 and the port 104. In other words, the master cylinder communication port 13 of the flow valve 9 is communicated with the master cylinder 2, the communication between the pump communication port 18 and the master cylinder communication port 13 is shut off, and the communication between the master cylinder 2 and the intake side of the pump 32 is shut off. In the activated state, the magnetic switching valve 99 communicates the port 100 with port 104, and the port 102 with port 101. That is, the communication between the master cylinder communication port 13 of the flow valve 9 and the master cylinder 2 is shut off, and the pump communication port 18 is communicated with the master cylinder communication port 13, and the master cylinder 2 is communicated with the intake side of the pump 32.

The details of the construction will be described. The magnetic switching valve 99, as shown in FIG. 6, is provided with a housing 105, which is in a form of a cylinder having closed ends which are, respectively, provided with ports 102, 104 along the axial direction of the housing 105. The housing 105 is provided with a first valve chamber 106 on the port 102 side, and a second valve chamber 108 on the port 104 side. The first valve chamber 106 and the second valve chamber 108 are communicated with each other through the communication hole 107. The first valve chamber 106 houses a spherical first valve body 110 and a spring 109. The first valve body 110 is pressed by a spring 109 so as to close one end of the communication hole 107. The second valve chamber 108 is provided with a second valve body 112 and a spring 113. The second valve body 112 is movably disposed inside the housing 105, and on its port 104 side, there is a valve member 111 to enable closing the port 104. The spring 113 biases the second valve body 112 in the direction of closing the port 104. The second valve body 112 is provided with a through hole 114 along its axial direction. In the second valve body 112 is formed an axial section 115 on the first valve chamber 106 side. This axial section 115 is able to close the communication hole 107. In the second valve body 112 is formed a protrusion section 116 having a smaller diameter than the communication hole 107. The protrusion section 116 extend into the first valve chamber 106 side in such a way that the axial section 115 is closing the communication hole 107. The opening of the port 101 is formed in the central location of the communication hole 107 of the housing 105, and the opening of the port 100 is formed in the position of the housing 105 in which the axial section 115 is to be inserted.

Here, when the solenoid 117 disposed in the housing 105 is in the deactivated state, the second valve body 112 closes the port 104 with the biasing force of the spring 113, and the axial section 115 is separated from the other end of the communication hole 107 so as to communicate the port 100 with the port 101, and the protrusion section 116 is in the withdrawn state from the first valve chamber 106. By the withdrawal of the protrusion section 116, the first valve body 110 is in the state of closing the one end of the communication hole 107 with the biasing force of the spring 109, thereby the port 102 is in the state of being closed. When the solenoid 117 is activated, the second valve body 112 is drawn into the solenoid 117, and moves against the biasing force of the spring 113. In this condition, the second valve body 112 opens the port 104 closes the other end of the communication hole 107 with the axial section 115, and separates the first valve body 110 from the one end of the communication hole 107 by the action of the protrusion section 116. By so doing, the port 100 and the port 104 are communicated through the through hole 114 and others, and the port 101 and the port 102 are communicated.

The overall operation of the third embodiment of the brake fluid pressure control apparatus is about the same as that of the first embodiment, therefore the explanation will center around the operation of the dual-position four-port magnetic switching valve 99.

When the traction and antiskid control operations are not operating, the magnetic switching valve 99 is deactivated, and only the port 100 and the port 101 are communicated. In this condition, if the brake pedal 3 is operated, and the brake fluid pressure from the master cylinder 2 is transmitted, this brake fluid pressure is admitted through the magnetic switching valve 99, and introduced into both flow valves 9, 10, without being allowed to escape to the intake side of the pump 32. Because the spool 19 is in the stationary state, the two flow valves 9, 10 permit the introduced fluid pressure to be transmitted to the wheel cylinders 4, 5 through the master cylinder communication port 13.

If the antiskid control operation is activated when the apparatus is in the above condition, and even if the pump 32 discharges the brake fluid, the discharge pressure of the pump 32 is prevented from returning to the master cylinder 2 because of the closed port 102 in the magnetic switching valve 99; therefore, the fluid pressure is transmitted from the pump communication port 18 and the fourth hole 44 of the flow valves 9, 10, which have become communicated by the spool 19 moving to the operating position, to either the wheel cylinders 4, 5, through the lower port 21 or to the reservoir 28 through the reservoir communication port 17.

On the other hand, during the traction control operation, the magnetic switching valve 99 is activated, and the port 101 and the port 102 are communicated, and the port 100 and the port 104 become communicated. Then, when the pump 32 is operated, the pump 32 withdraws the brake fluid of the master cylinder 2 from the fluid passage 7 and discharges the brake fluid. At this time, the spool 19 is in the stationary position, and even though the communication between the pump communication port 18 and the wheel cylinder communication port 16 is shut off, the discharged brake fluid is delivered to the master cylinder communication port 13 through the magnetic switching valve 99, without being returned to the master cylinder 2. The brake fluid passes through the spool 19 in the stationary position, and is delivered to the wheel cylinder 4 through the upper port 20.

Thus, in addition to the effects described in the first embodiment, the apparatus becomes compact because the switching device and the shut-off device are both included in one magnetic switching valve.

What is claimed is:

1. A brake fluid pressure control apparatus for controlling fluid pressure in an antiskid braking system of a vehicle having a master cylinder operatively connected to a pedal, and having a wheel cylinder associated with each wheel of said vehicle, wherein the fluid pressure is reduced or increased in accordance with a condition of skidding of each wheel, said apparatus comprising a flow value and a flow switching device: wherein the flow valve comprises:

(a) a casing having a master cylinder communication port communicating with an output fluid passage of said master cylinder; a wheel cylinder communication port communicating with said wheel cylinder; a pump communication port communicating with a discharge side of a pumping device for intaking and discharging brake fluid;

(b) a spool slidably disposed in said casing, said spool being in a stationary position when antiskid control is not operating by being pressed by a spool spring so as to communicate said master cylinder communication port with said wheel cylinder communication port; and (c) a fluid flow control device which closes said pump communication port when the spool is in said stationary position, and at least during a repressurization phase of antiskid control operation, said spool moves against the biasing force of said spool spring to an operating position because of a pressure differential generated between the end sections of said spool, and communicates said pump communication port with said wheel cylinder communication port;

and said flow switching device is disposed between said output fluid passage of said master cylinder and said master cylinder communication port for switching between a first state and a second state, such that in said first state, said master cylinder communication port is communicated with said output fluid passage of said master cylinder while the communication between said pump communication port and said master cylinder communication port is shut-off, and in said second state, the communication between said master cylinder communication port and said output fluid passage of said master cylinder is shut-off while said pump communication port is communicated with said master cylinder communication port.

2. An apparatus as claimed in claim 1, wherein said apparatus is provided with a shut-off device for switching between a closed position and an open position of communication of said output fluid passage of said master cylinder with intake side of said pumping device.

3. An apparatus as claimed in claim 2, wherein said switching device comprises:

(a) a piston for receiving discharge pressure of said pumping device at one end region of said piston while receiving fluid pressure of said output fluid passage of said master cylinder at the opposite end region of said piston; and (b) a piston spring for applying a biasing pressing force on the opposite end region of said piston;

wherein said piston controls a brake fluid flow such that, in the absence of a brake fluid pressure in the output fluid passage of said master cylinder and upon receiving said discharge fluid pressure from said pumping device, said piston moves against the biasing pressing force of said piston spring, and the communication between said output fluid passage of said master cylinder and said master cylinder communication port is shut off while said pump communication port is communicated with said master cylinder communication port; and in the presence of a brake fluid pressure in the output fluid passage of said master cylinder, said output fluid passage of said master cylinder is communicated with said master cylinder communication port, and the communication between said pump communication port and said master cylinder communication port is shut off.

4. An apparatus as claimed in one of claim 3, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

5. An apparatus as claimed in claim 2, wherein said switching device and said shut-off device comprise a dual-position four-port magnetic switching valve which switches between a first fluid flow condition and a second fluid flow condition such that in the first fluid flow condition said master cylinder communication port is communicated with said output fluid passage of said master cylinder, and the communication between said pump communication port and said master cylinder communication port is shut off and the communication between said output fluid passage of said master cylinder and the intake side of said pumping device is shut off, and in the second fluid flow condition, the communication between said master cylinder communication port and said output fluid passage of said master cylinder is shut off, and said pump communication port is communicated with said master cylinder communication port and communicating said output fluid passage of said master cylinder with said intake side of said pumping device.

6. An apparatus as claimed in one of claim 5, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

7. An apparatus as claimed in one of claim 2, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for a flow valve associated with each driving wheel in each line of said cross-piped brake line system.

8. An apparatus as claimed in claim 1, wherein said apparatus is provided with a shut-off device for switching between a closed position and an open position of communication between a reservoir section for storing brake fluid of said master cylinder, and an intake side of said pumping device.

9. An apparatus as claimed in claim 8, wherein said switching device comprises:
   (a) a piston for receiving discharge pressure of said pumping device at one end region of said piston while receiving fluid pressure of said output fluid passage of said master cylinder at the opposite end region of said piston; and
   (b) a piston spring for applying a biasing pressing force on the opposite end region of said piston;
wherein said piston controls a brake fluid flow such that,
   in the absence of a brake fluid pressure in the output fluid passage of said master cylinder and upon receiving said discharge fluid pressure from said pumping device, said piston moves against the biasing pressing force of said piston spring, and the communication between said output fluid passage of said master cylinder and said master cylinder communication port is shut off while said pump communication port is communicated with said master cylinder communication port; and
   in the presence of a brake fluid pressure in the output fluid passage of said master cylinder, said output fluid passage of said master cylinder is communicated with said master cylinder communication port, and the communication between said pump communication port and said master cylinder communication port is shut off.

10. An apparatus as claimed in one of claim 9, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

11. An apparatus as claimed in one of claim 8, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

12. An apparatus as claimed in claim 1, wherein said switching device comprises:
   (a) a piston for receiving discharge pressure of said pumping device at one end region of said piston while receiving fluid pressure of said output fluid passage of said master cylinder at the opposite end region of said piston; and
   (b) a piston spring for applying a biasing pressing force on the opposite end region of said piston;
wherein said piston controls a brake fluid flow such that,
   in the absence of a brake fluid pressure in the output fluid passage of said master cylinder and upon receiving said discharge fluid pressure from said pumping device, said piston moves against the biasing pressing force of said piston spring, and the communication between said output fluid passage of said master cylinder and said master cylinder communication port is shut off while said pump communication port is communicated with said master cylinder communication port; and
   in the presence of a brake fluid pressure in the output fluid passage of said master cylinder, said output fluid passage of said master cylinder is communicated with said master cylinder communication port, and the communication between said pump communication port and said master cylinder communication port is shut off.

13. An apparatus as claimed in one of claim 12, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

14. An apparatus as claimed in one of claim 1, wherein said apparatus is associated with a cross-piped brake line system, wherein said flow valve is communicated with each of the wheel cylinders for front wheels and rear wheels, and a pumping device is provided for each line of said cross-piped brake line system, and said switching device is provided for each flow valve associated with a driving wheel in each line of said cross-piped brake line system.

* * * * *

UNITED STATES PATENT AND TRADEMARK OFFICE
CERTIFICATE OF CORRECTION

PATENT NO. : 5,472,268
DATED : December 5, 1995
INVENTOR(S) : Hiromi Ando et al.

It is certified that error appears in the above-indentified patent and that said Letters Patent is hereby corrected as shown below:

Column 16, line 3, after "with" insert --an--.

Column 17, line 3, delete "a" and insert --each--.

Column 17, line 3, delete "each" (first occurrence) and insert --a--.

Signed and Sealed this

Nineteenth Day of March, 1996

*Attest:*

BRUCE LEHMAN

*Attesting Officer*     *Commissioner of Patents and Trademarks*